Jan. 26, 1965  J. E. THOMPSON  3,166,786
SAUSAGE STUFFER
Filed Feb. 21, 1963
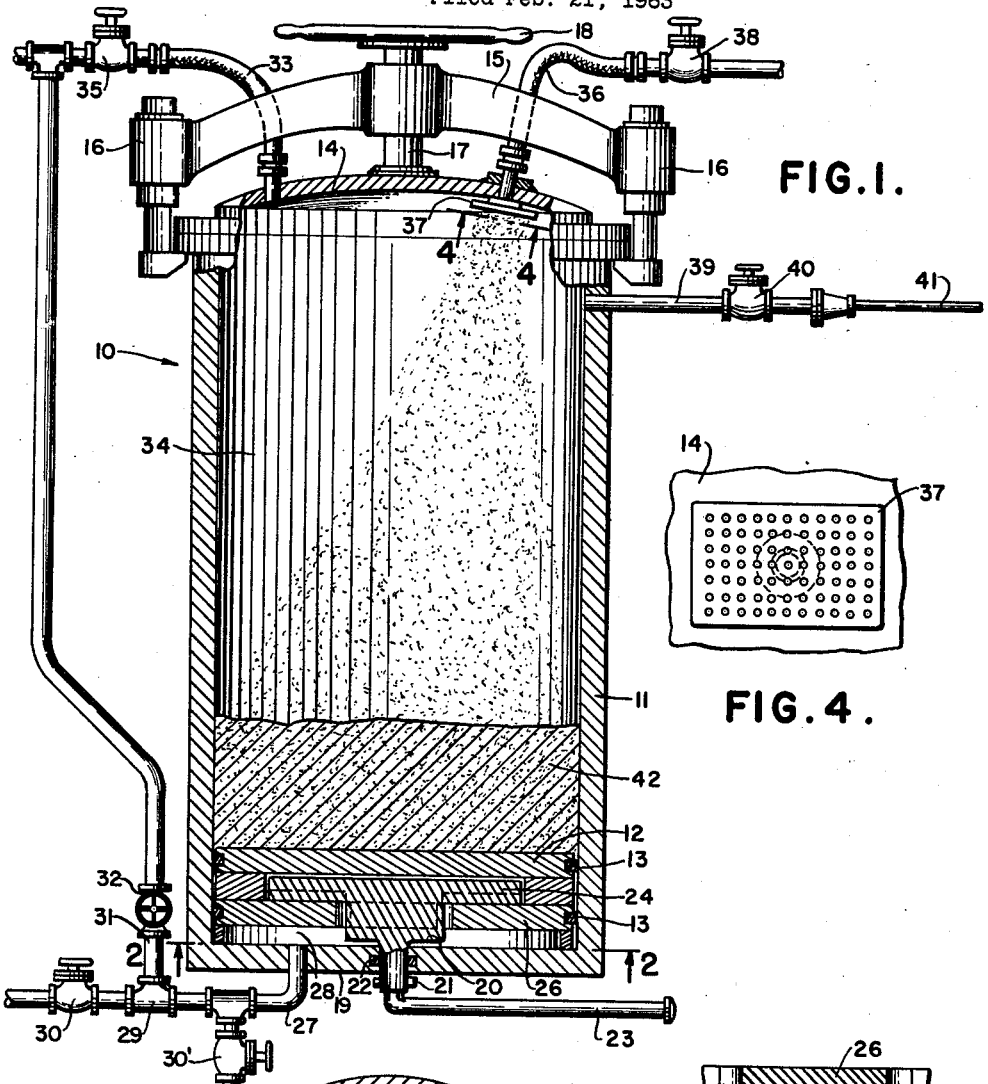
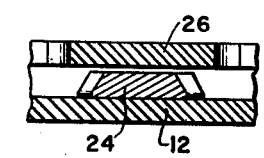
INVENTOR
John E. Thompson

3,166,786
SAUSAGE STUFFER
John E. Thompson, P.O. Box 2023, Chicago, Ill.
Filed Feb. 21, 1963, Ser. No. 260,955
3 Claims. (Cl. 17—45)

This invention relates to what is known in the meat industry as stuffers, and more in particular to a device and method of introducing ground meat into casings, such as sausage casings, and cans.

Heretofore it has been the practice in sausage manufacture to grind or chop the meat to obtain the desired size reduction. Following this the meat is normally mixed in a separate machine to incorporate spices and curing materials and to blend ground meat of different types. Some modern choppers adequately mix without performing this as a separate operation. Grinding, chopping and mixing tend to incorporate air. Mixing under vacuum is often used to remove some of the air, but air is reincorporated in the charging of the material into the stuffer. When air is present in the stuffer it is extruded with the meat under very high pressure and introduced from the stuffer into the casing where immediate expansion takes place, which rips the casing and requires discontinuance of the operation.

An improved process appears in the Moses Patents No. 2,690,589 and 2,690,970. In the latter patent a process and apparatus is described wherein the ground meat is introduced into the cylinder and then subjected to a vacuum to remove the air. It is then forced out of the cylinder under pressure into the sausage casing. This apparatus and method has the disadvantage of pressing air into the meat when it is placed in the cylinder, which air is not removed completely by the application of the vacuum.

It is an object of the present invention to provide a process for the filling of sausage casings and processing sausage meat wherein all of the air is removed from the meat, in the last operation before the meat is introduced into the casing so as to avoid any reentrainment of air.

It is another object of this invention to provide a process where the meat is blended and ground and then introduced into a cylinder, the air removed during the introducing into the cylinder and the meat then extruded under pressure through a normal stuffing horn.

The various features of novelty which characterize this invention are pointed out with particularity in the claims annexed to and forming part of this application. For a better understanding of the invention, however, and the advantages possessed by it, reference should be had to the accompanying drawings and descriptive matter in which has been illustrated and described a preferred embodiment of the invention.

In the drawings:

FIGURE 1 is a plan view partly in section showing the stuffing apparatus.

FIGURE 2 is a sectional view on line 2—2 of FIG. 1, showing the locking mechanism.

FIGURE 3 is a sectional view on line 3—3 of FIG. 2.

FIGURE 4 is an enlarged view on line 4—4 of FIG. 1 showing the intake plate.

A stuffer 10, shown in FIG. 1, has a body portion 11 in the form of a cylinder. Within the cylinder 11 is a piston 12 retained in sliding engagement with the interior surface of the cylinder 11 and having sealing means 13, 13 thereon. A cap or closure member 14 is held in position by a releasable yoke 15 with the usual clamping arrangement 16, 16 on each side thereof and has the pressure member 17 operating in the center portion of the yoke to force the cover member 14 into position and hold it in air-tight engagement with the upper portion of the cylinder. The pressure member 17 is operated by means of the handle 18 operating through a screw (not shown) which will force the pressure member 17 downwardly. The cylinder 11 has the bottom plate 19 therein. The plate 19 has an opening therethrough through which the shaft 21 passes. This shaft has a locking means 20 operated by means of the shaft 21 and which is sealed by sealing element 22 to maintain this shaft in air-tight engagement with the bottom plate 19. The shaft 21 is operated by the arm 23 so as to aline the vanes 24, 24 with the openings 25, 25 in the bottom of the piston. These vanes when rotated overlap the inwardly projecting portions 26, 26 on the bottom of the piston 12. The conduit 27 feeds into the chamber 28 below the piston and above the bottom plate. The conduit 27 leads to the T 29, one side of the T being connected by means of the valve 30 to a source of air under pressure (not shown). The other side of the T is connected by means of the conduit 31 to the valve 32 to a source of vacuum (not shown). The conduit 33 is connected to the chamber 34 in the cap 14. This conduit 33 is connected to a source of vacuum by means of the valve 35. A conduit 36 opens into the chamber 34 through the cap 14 and has a perforated plate 37 thereover. This conduit has the valve means 38 therein to control the inflow of ground meat to the chamber 34. The conduit 39 is connected to the chamber 34 and has the valve means 40 associated therewith to control the flow of ground meat to the stuffing horn 41.

In operation the cap portion 14 is locked in position by means of the yoke 15 and the pressure element 17. Valve 30 is closed and the lower part of the piston is vented by opening valve 30' to allow the piston to slide downwardly. This piston is then locked in position, as shown in FIG. 1 by means of the arm 23. The valve 32 is then closed and the valve 35 opened to create a vacuum within the chamber 34, the meat, previously ground and seasoned, being admitted under pressure through the conduit 36 by means of opened valve 38 through the perforated plate 37, is subjected to the vacuum within the chamber 34 at the point and during the process of admission. The perforations in the plate 37 cause the meat to be admitted in many small streams whereby the vacuum completely removes the air from the meat before the meat falls to the bottom of chamber 34. When a charge has been introduced into the chamber 34 above the piston 12 the vacuum line is closed off by means of the valve 35, the handle 23 rotated to free the piston and the valve 30 opened to admit compressed air below the piston forcing it upwardly. The finely comminuted meat is forced outwardly through the conduit 39 through the valve 40 and into the stuffing horn 41 where it is introduced into the sausage skins or other casings. When the piston has traveled the full distance and the ground meat 42 is extruded therefrom, the compressed air valve 30 is closed and the chamber below the piston is vented by means of the valve 30' allowing the piston 12 to move downwardly into the position shown in FIG. 1. The piston is then locked by means of the handle 23 and the cycle is then ready to be repeated. It is only necessary to remove the cap portion 14 when it becomes desirable to clean the apparatus. The handle 18 is then rotated, raising the pressure member 17 and the yoke 15 may then be removed allowing the cap member 14 to also be removed.

In the above description, the piston is moved upwardly by forcing compressed air below the piston and allowed to move downwardly by being vented to the atmosphere, and locked into position. Then, the meat may be admitted by applying the vacuum to the upper portion of the cylinder. Thereafter, the meat may be expelled by unlocking the piston and applying air pressure below the piston. Also, while in the above description compressed air is used, it is of course understood, that any pressurized fluid will function, that is, water or oil may be used to force the piston upwardly after the charge of meat has been admitted.

Stuffers are generally within the range of 50 to 500 lbs. normal capacity. Almost exclusively large plants use the 500 lbs. size range in groups.

In order to give specific examples of the process herein disclosed a 500 lb. stuffer was used and the charge was reduced to about 400 lbs. in order to allow free space above the cylinder. The vacuum required to satisfactorily remove entrapped air is in the order of 20 to 27 inches and in the following examples 24 inches are used. This will remove all of the air entrapped with the meat. In order to remove air in solution in the meat water it will be necessary to have an absolute pressure of 0.25 inch which at a temperature of 40° F. would approach the boiling point of the water and cause the release of the air dissolved therein.

*Example 1*

Pork luncheon meat production for canning:
    Assemble and weigh the ingredients_____400 lbs.
    Ground through 1/8 inch blade
    Put ground meat in the sausage mixer
    Add spices and curing material
    Mix for 3 minutes
    Transfer to the de-aerating stuffer with 24 inches of vacuum in the de-aerating space
    Extrude into cans

*Example 2*

Linked pork sausage production:
    Assemble and weigh the well chilled meat ingredients _____ 400 lbs.
    Grind in one pass through a 2/16 inch blade
    Transfer to sausage mixer and add spices
    Mix a minimum amount of time of about 2 minutes
    Transfer to de-aerating stuffer, using 24 inches of vacuum in the de-aerating space. Stuff into sheep casings employing 80 lbs. pressure under the cylinder.
    Low air pressure is required to prevent breakage of the small delicate natural casings.

*Example 3*

Assemble and weigh the meat, spices and curing ingredients for 600 lbs. batch. Chop in a rotary cutter to form the thin cut meat emulsion and thoroughly mix the ingredients. Transfer directly to a hopper serving two or more de-aerating stuffers operating to provide a continuous stream of meat emulsion to multiple stuffing lines. De-aerate the meat as it enters the stuffer by providing a vacuum of 24 inches in the de-aerating space, as the meat enters. Stuff into artificial casings with 120 lb. air pressure below the piston.

Examples 2 and 3 show the extremely high rate of pressure that may safely be employed with the de-aerating stuffer, in Example 2 above employing the delicate natural casings. The reason for this is the freedom from air and for this reason the meat comes from the stuffer horn in easy gentle flow. The explosive nature of air extruded with meat under pressure is avoided by removing the air in the last step, that is in the stuffer.

In the process which is applicable to the apparatus described above, a batch process is used. This process comprises pumping finely comminuted meat through a means for dividing the meat into small streams into a cylinder which is maintained under a vacuum. When the cylinder has obtained a full charge the admission is discontinued, the vacuum is also discontinued and the meat is expelled under pressure.

A continuous process may also be used wherein the meat is pumped into the cylinder under pressure admitted through a dividing means and the cylinder maintained under a vacuum. The gas-free finely divided meat may be removed from the bottom of the cylinder continuously by means of a worm drive device and forced into the sausage casings after removal therefrom.

This application is a continuation-in-part of application Serial No. 162,294 filed December 27, 1961 in the name of John E. Thompson now Patent No. 3,108,319.

While in accordance with the provisions of the statute there has been illustrated and described the best form of embodiment of this invention, now known, it will be apparent to those skilled in the art that changes may be made in the form of the apparatus and process disclosed without departing from the spirit of this invention as set forth in the appended claims, and that in some cases certain features of this invention may be used to advantage without a corresponding use of other features.

What is claimed is:

1. A process for operating a large capacity batch type sausage stuffer, which comprises:
    (a) evacuating a meat cylinder at the top thereof to create a vacuum of 20 to 29¾ inches of mercury within the cylinder,
    (b) admitting comminuted meat in small streams near the top of said cylinder, but below the point of evacuation,
    (c) discontinuing the admission of meat and sealing the vacuum line when the cylinder is partially full, and
    (d) expelling the de-aerated meat under pressure from said cylinder through an exhaust conduit into sausage casings.

2. A process for operating a large capacity batch type sausage stuffer, which comprises:
    (a) evacuating a meat cylinder at the top thereof to create a vacuum of about 24 inches of mercury within the cylinder,
    (b) admitting comminuted meat in small streams near the top of said cylinder, but below the point of evacuation,
    (c) discontinuing the admission of meat and sealing the vacuum line, when the cylinder is partially full, and
    (d) expelling the de-aerated meat under pressure from said cylinder through an exhaust conduit into sausage casings.

3. A process for operating a large capacity batch type sausage stuffer, which comprises:
    (a) evacuating a meat cylinder at the top thereof to create a vacuum of about 29¾ inches of mercury within the cylinder,
    (b) admitting comminuted meat in small streams near the top of said cylinder, but below the point of evacuation,
    (c) discontinuing the admission of meat and sealing the vacuum line, when the cylinder is partially full, and
    (d) expelling the de-aerated meat under pressure from said cylinder through an exhaust conduit into sausage casings.

References Cited in the file of this patent
UNITED STATES PATENTS

| | | |
|---|---|---|
| 3,036,332 | Townsend | May 29, 1962 |
| 3,081,484 | Schnell | Mar. 19, 1963 |